US009415664B2

(12) United States Patent
Hoshi et al.

(10) Patent No.: US 9,415,664 B2
(45) Date of Patent: Aug. 16, 2016

(54) WINDSHIELD CONTROL DEVICE

(71) Applicant: HONDA MOTOR CO., LTD., Tokyo (JP)

(72) Inventors: Tomohiro Hoshi, Wako (JP); Yojiro Tsutsumi, Wako (JP); Takeshi Konno, Wako (JP); Kenji Suzuki, Wako (JP); Sadanao Ichimi, Wako (JP); Masakuni Ando, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/791,786

(22) Filed: Jul. 6, 2015

(65) Prior Publication Data
US 2016/0052373 A1    Feb. 25, 2016

(30) Foreign Application Priority Data

Aug. 20, 2014   (JP) ................................. 2014-167481

(51) Int. Cl.
*B60J 1/04*     (2006.01)
(52) U.S. Cl.
CPC ........................................ *B60J 1/04* (2013.01)
(58) Field of Classification Search
CPC .................................... E05F 15/70; B60J 1/04
See application file for complete search history.

(56) References Cited

U.S. PATENT DOCUMENTS

| 7,086,096 B1* | 8/2006 | Montero ................. A42B 3/224 |
| | | 2/424 |
| 7,281,750 B1* | 10/2007 | Wise ........................ B62J 17/04 |
| | | 280/288.4 |
| 2003/0125845 A1* | 7/2003 | Carlstedt ................. G08G 1/161 |
| | | 701/1 |
| 2004/0119580 A1* | 6/2004 | Spielman .............. B60R 25/102 |
| | | 340/5.52 |
| 2005/0135297 A1 | 6/2005 | Katayama |
| 2008/0197658 A1* | 8/2008 | Yoshitake .................. B60J 1/04 |
| | | 296/96.21 |
| 2014/0131128 A1* | 5/2014 | Schuhmacher .......... B62J 17/04 |
| | | 180/219 |
| 2014/0159426 A1* | 6/2014 | Takahashi ................ B62J 17/04 |
| | | 296/192 |

FOREIGN PATENT DOCUMENTS

| JP | 5-92788 A | 4/1993 |
| JP | 7-329859 A | 12/1995 |
| JP | 2005-184321 A | 7/2005 |

* cited by examiner

*Primary Examiner* — Rodney Butler

(74) *Attorney, Agent, or Firm* — Westerman, Hattori, Daniels & Adrian, LLP

(57) ABSTRACT

A windshield control device is configured such that a position and/or an angle in a height direction of a windshield attached to a front part of a vehicle is optionally adjusted by an actuator. The windshield control device includes receiving means that receives a signal related to a head set having a microphone used by a rider, and control means that drives and controls the windshield. The control means upwardly moves the windshield according to the signal received by the receiving means. The signal is a tone signal input from the microphone or a manipulated signal of an active switch for operating the head set or the receiving means. The windshield is upwardly moved according to magnitude of the tone signal input from the microphone after the receiving means is operated.

14 Claims, 8 Drawing Sheets

WINDSHIELD CONTROL DEVICE

FIELD OF THE INVENTION

The present invention relates to a windshield control device, specifically a windshield control device configured to assist voice input into a microphone of a head set.

BACKGROUND OF THE INVENTION

In the past, there have been various proposals to achieve more comfortable traveling of a motorcycle or the like by using a head set having a microphone and a speaker that can be used while wearing a helmet.

JP-A No. H5-92788 discloses a vehicle with voice recognition feature, configured such that a lamp device, a horn, and the like of a motorcycle can be voice-activated by putting into rider's output toward a microphone of a head set.

Also, JP-A No. 2005-184321 discloses a telephone call system configured such that a telephone call can be made through a head set by allowing communication with a terminal of a mobile telephone on a side of a vehicle body using a predetermined radio communication standard.

Here, if a front side of the microphone is not covered with a cap body of the helmet or a face shield, traveling wind blowing against the microphone is picked up as noise (wind noise). As a result, there are possibilities that a voice recognition rate is reduced and an unclear telephone call is made.

On the other hand, in the case of a vehicle including an electric windshield disclosed in JP-A No. H7-329859, the traveling wind is prevented from blowing against the microphone regardless of a shape or the like of the helmet by adjusting the windshield to a sufficiently high position when needed.

SUMMARY OF THE INVENTION

Although the electric windshield disclosed in JP-A No. H7-329859 is configured in such a manner that the height of the windshield can be adjusted according to preference of a rider by an adjustment switch in front of the rider, it is necessary to adjust the windshield to an effect height for a noise reduction every time voice input or the telephone call is made. As a result, there is a troublesome problem.

The present invention has been achieved in view of the above-mentioned circumstances in related art, and one object of the present invention is to provide a windshield control device configured to appropriately assist voice input into a microphone of a head set without performing special manipulation.

In order to achieve this objective, according to a first aspect of the present invention, there is provided a windshield control device configured in such a manner that a position and/or an angle in a height direction of a windshield (7) attached to a front part of a vehicle is optionally adjusted by an actuator (37). The windshield control device includes: receiving means (60) that receives a signal related to a head set (23) having a microphone (M) used by a rider (P); and control means (55) that drives and controls the windshield (7). The control means (55) upwardly moves the windshield (7) according to the signal received by the receiving means (60).

With the first aspect, the windshield control device includes the receiving means that receives the signal related to the head set having the microphone used by the rider, and the control means that drives and controls the windshield. The control means upwardly moves the windshield according to the signal received by the receiving means. Thereby, the windshield can be automatically driven without performing special manipulation by the rider. For at least this reason, since the windshield is moved to a high position, a high voice recognition rate when performing voice activation and a clear telephone call when making a telephone call can be kept.

Also, according to a second aspect of the present invention, the signal is a tone signal input from the microphone (M).

With the second aspect, the signal is the tone signal input from the microphone. For this reason, the windshield can be driven without manipulating a switch by a finger.

Also, according to a third aspect of the present invention, the signal is a manipulated signal of an active switch (43) for operating the head set (23) or the receiving means (60).

With the third aspect, the signal is the manipulated signal of the active switch for operating the head set or the receiving means. For at least this reason, the windshield can be driven by optionally manipulating the switch. Also, since the movement of the windshield according to the tone signal is not performed unless the rider does not manipulate the active switch, unintended operation for the rider can be prevented.

According to a fourth aspect of the present invention, the control means (55) upwardly moves the windshield (7) according to a frequency and/or magnitude of the tone signal input from the microphone (M) after the receiving means (60) is operated.

With the fourth aspect, since the control means upwardly moves the windshield according to the frequency or the magnitude of the tone signal input from the microphone after the receiving means is operated, the windshield can be automatically moved to a position with the noise caused by the wind noise sufficiently reduced, without performing the special manipulation by the rider. For at least this reason, the high voice recognition rate when performing the voice activation and the clear telephone call when making the telephone call can be kept without repeatedly adjusting the height until the noise is sufficiently reduced or without conducting a study how far the windshield has to be moved in order to sufficiently reduce the noise.

Also, according to a fifth aspect of the present invention, the receiving means (60) is provide with at least either voice recognition means (61) that recognizes voice of the rider (P) included in the tone signal in order to voice-activate an apparatus loaded on the vehicle or communication means (63) that transmits and receives the tone signal between the communication means and a mobile telephone or mobile device (T) carried by the rider (P).

With the fifth aspect, the receiving means is provide with at least either the voice recognition means that recognizes the voice of the rider included in the tone signal in order to voice-activate the apparatus loaded on the vehicle or the communication means that transmits and receives the tone signal between the communication means and the mobile telephone carried by the rider. For at least this reason, it is possible to provide the windshield control device corresponding to perform the voice activation with respect to a navigation device or the like by using the head set or to make the telephone call through the mobile telephone.

Also, according to a sixth aspect of the present invention, the windshield control device further includes a vehicle speed detection part (59) that detects a speed of the vehicle, and the control means (55) upwardly moves the windshield (7) according to the speed of the vehicle.

With the sixth aspect, since the windshield control device further includes the vehicle speed detection part that detects the speed of the vehicle. The control means upwardly moves the windshield according to the speed of the vehicle. For at least this reason, the windshield can be promptly set to a predetermined height without conducting new arithmetic processing or the like.

Also, according to a seventh aspect of the present invention, the active switch (43) is configured to double as a switch to give at least one of a command to start voice activation with respect to the apparatus loaded on the vehicle, a command to start transmission by the mobile telephone (T), and a command to start a response to an incoming call with respect to the mobile telephone (T).

With the seventh aspect, the active switch is configured to double as the switch to give at least one of the command to start voice activation with respect to the apparatus loaded on the vehicle, the command to start transmission by the mobile telephone, and the command to start the response to the incoming call with respect to the mobile telephone. For at least this reason, the receiving means is operated in conjunction with the manipulation of the switch for giving the command to start the predetermined operation, and accordingly, the automatic adjustment of the windshield for the noise reduction can be achieved.

Also, according to an eighth aspect of the present invention, the receiving means (60) detects a noise level (NL) included in the tone signal, and the control means (55) upwardly moves the windshield (7) when the noise level (NL) exceeds a first predetermined value (NL1).

With the eighth aspect, the receiving means detects the noise level included in the tone signal, and the control means upwardly moves the windshield when the noise level exceeds the first predetermined value. For at least this reason, the windshield can be moved according to the noise level included in the tone signal. In other words, the windshield is not required to be moved if the noise level is sufficiently low, and a moving distance of the windshield can be increased according to an increase in the noise level.

Also, according to a ninth aspect of the present invention, the control means (55) stops upward movement of the windshield (7) when the noise level (NL) is less than a second predetermined value (NL2) lower than the first predetermined value (NL1) during the upward movement of the windshield (7).

With the ninth aspect, the control means stops the upward movement of the windshield when the noise level is less than the second predetermined value lower than the first predetermined value during the upward movement of the windshield. For at least this reason, the movement of the windshield is stopped in necessary and sufficient height according to the noise reduction in association with moving up of the windshield, so that the position of the windshield can be prevented from being unnecessarily heightened. Also, the movement of the windshield is temporarily stopped, so that the windshield can be prevented from being frequently moved according to the noise level.

Also, according to a tenth aspect of the present invention, the control means (55) restarts the upward movement of the windshield (7) when the noise level (NL) again exceeds the first predetermined value (NL1) after the noise level (NL) is less than the second predetermined value (NL2).

With the tenth aspect, the control means restarts the upward movement of the windshield when the noise level again exceeds the first predetermined value after the noise level is less than the second predetermined value. For at least this reason, if there is a difference between the first predetermined value and the second predetermined value, hysteresis can be set to a movement condition of the windshield, and a noise reduction effect according to a change in a situation can be obtained while suppressing frequent movement of the windshield.

Also, according to an eleventh aspect of the present invention, the windshield control device further includes a noise database (64) for storing sample data of noise caused by traveling wind, and the control means (55) recognizes the noise included in the tone signal received by the microphone (M) by comparing with and checking against the sample data.

With the eleventh aspect, the windshield control device further includes the noise database for storing the sample data of the noise caused by the traveling wind. The control means recognizes the noise included in the tone signal received by the microphone by comparing with and checking against the sample data. For at least this reason, the other tone signal not caused by the voice of the rider or the wind noise is not recognized as the noise required for moving up the windshield, and the control means reacts with only the noise caused by the wind noise, so that the height of the windshield can be adjusted.

Further, according to a twelfth aspect of the present invention, the control means (55) returns the windshield (7) to a position before the active switch (43) is manipulated, when detecting either termination of the voice activation with respect to the apparatus loaded on the vehicle or termination of a telephone call through the mobile telephone (T), after the active switch (43) is manipulated.

With the twelfth aspect, the control means returns the windshield to the position before the active switch is manipulated, when detecting either the termination of the voice activation with respect to the apparatus loaded on the vehicle or the termination of the telephone call through the mobile telephone, after the active switch is manipulated. For at least this reason, it is not necessary to manually return the windshield to the original position after the noise reduction is no more required, and convenience and conformableness for the rider are improved.

BRIEF DESCRIPTION OF THE DRAWINGS

The present invention will be described with reference to the accompanying drawings, wherein.

DETAILED DESCRIPTION OF THE INVENTION

Hereinafter, an embodiment of the present invention will be described with reference to the aforementioned drawings.

Figure 1:
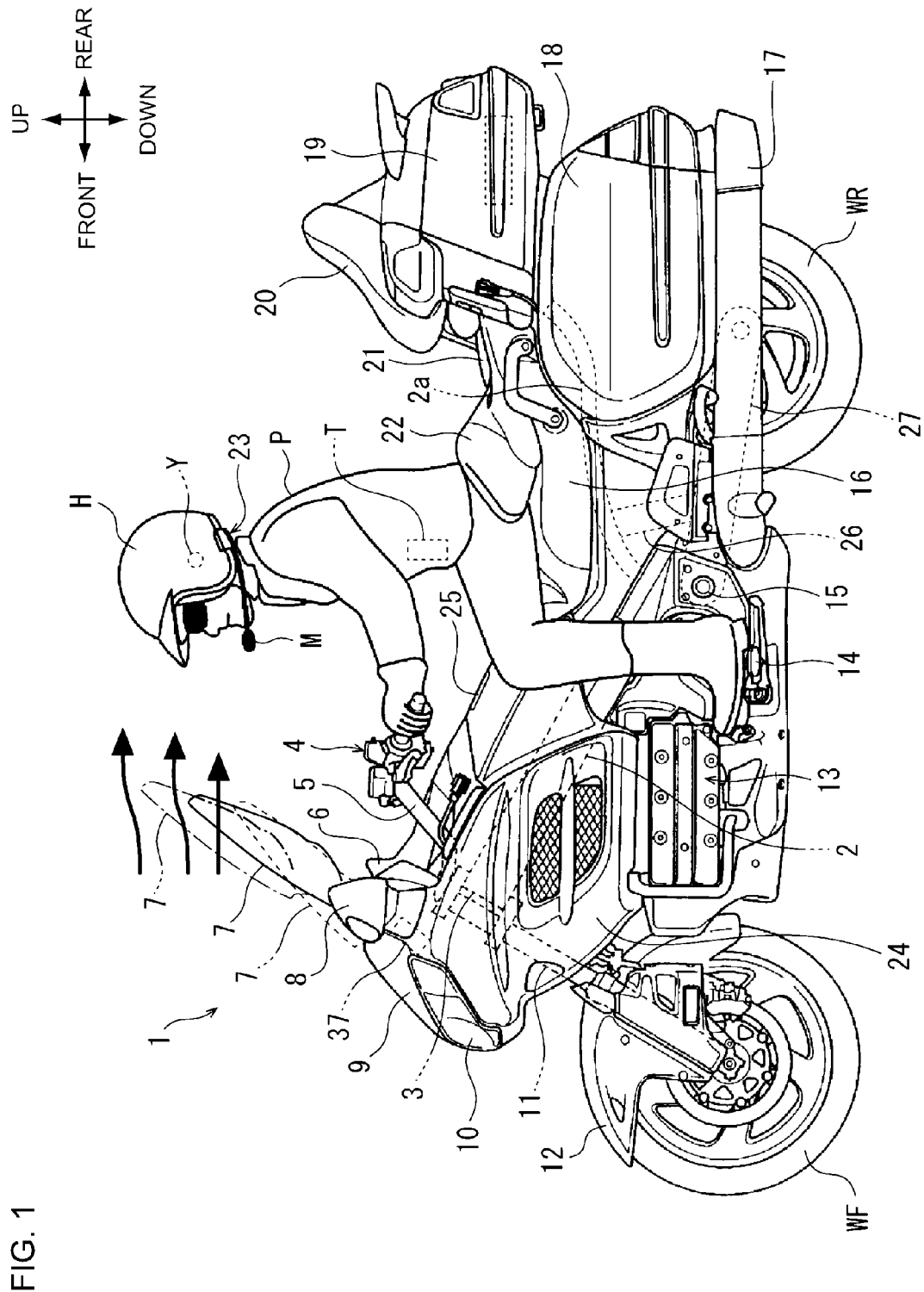
FIG. 1 is a left side view of a motorcycle applied with a windshield control device according to a first embodiment of the present invention.

FIG. 1 is a left side view of a motorcycle 1 applied with a windshield control device according to a first embodiment of the present invention. The motorcycle 1 as a saddle-ride type vehicle uses a large flat-six engine as a power source, and functions as a vehicle capable of traveling long distances and including a large cowling and a plurality of storage cases.

A head pipe 3 for rotatably pivotally supporting a steering stem (not shown) is provided in front of a vehicle body frame 2. A pair of right and left front forks 11 rotatably pivotally supporting a front wheel WF is fixed to and steerably supported on the steering stem. A steering handlebar 5 is attached to upper ends of the front forks 11, and a front fender 12 for coving an upper part of the front wheel WF is attached to substantially the center between the front forks 11.

An engine 13 is fixed in a suspended manner below a pair of right and left main tubes extending downward to the rear of a vehicle body from the head pipe 3. A pivot shaft 15 swingably pivotally supporting a swing arm 27 is provided behind the engine 13 and at rear ends of the main tubes. A rear frame 2a extending upward to the rear from above the pivot shaft 15 and supporting a seat 16, a pair of right and left pannier cases 18 and the like is provided at a rear end of the vehicle body frame 2. A pair of right and left steps 14 for placing feet of a rider P thereon is attached in front of and below the pivot shaft 15.

The swing arm 27 for rotatably pivotally supporting a rear wheel WR as a drive wheel is suspended from the vehicle body by a rear cushion 26 connected to the rear frame 2a. Driving force of the engine 13 is transmitted to the rear wheel WR trough a drive shaft (not shown) penetrating through the swing arm 27, and combustion gas from the engine 13 is discharged from rear ends of a pair of right and left mufflers 17.

The pair of right and left pannier cases 18 as storage boxes is attached above the mufflers 17. The seat 16 is provided with a hip guard 22 for the rider P seating on a front side and a seating part 21 for a pillion passenger. A backrest 20 for the pillion passenger is provided on a front surface part of a top case 19 as a storage box arranged in the center in a vehicle width direction.

A front side of the head pipe 3 is covered with a front cowl 9 having a headlight 10. A pair of right and left side cowls 24 for covering the vehicle body frame 2 and an upper part of the engine 13 is coupled to a rear part of the front cowl 9. A pair of right and left rearview mirrors 8 integrated with blinker devices is attached to a position in front of the steering handlebar 5 and on an outer side in the vehicle width direction. A filler lid 25 for a fuel tank is provided between the seat 16 and the steering handlebar 5.

A windshield 7 configured such that a position thereof in a height direction can be adjusted by an actuator 37 as windshield driving means is disposed in a position between the right and left rearview mirrors 8 and in front of the rider P. A meter panel 6 is provided in the center in the vehicle width direction immediately behind the windshield 7, and a switch box 4 having a plurality of operating switches is disposed on a left side of the steering handlebar 5 in the vehicle width direction.

A head set 23 provided with a microphone M, an earphone Y, and radio communication means is attached to a helmet H worn by the rider P. By the use of the head set 23, the rider P can hear audio assist or the like from the navigation device equipped on the vehicle body. In addition, the rider P can voice-activate various kinds of apparatuses such as the navigation device and the blinder devices. Further, the rider P can perform handsfree communication or the like through the mobile telephone or mobile device T carried by the rider P. Control means 50 having a function of communicating over a ratio with the head set 23 and a function of operating various kinds of apparatuses in association with the voice-activation is stored inside of the top case 19 located at the rear of the vehicle body.

A shape and an arrangement position of the control means 50 can be optionally changed according to a vehicle body structure. Also, the mobile telephone T may be stored on a side of the vehicle body, and the head set 23 may have such a structure that the head set 23 is not attached to the helmet H and the rider directly wears the head set.

The position of the windshield 7 in the height direction can be adjusted by an adjustment switch (see FIG. 3) provided with respect to the switch box 4, so that a degree that the traveling wind blows against mainly an upper half of a body of the rider is changed. During traveling of the vehicle, the rider P can perform adjustment depending on the rider's preference, for example, the windshield 7 is adjusted to a low position so that the traveling wind positively blows against the rider, or the windshield 7 is adjusted to a high position so as to keep out rain and wind.

On the other hand, as shown in the drawing, if a mask does not exist in front of the microphone M of the head set 23, there is a possibility that the traveling wind directly blows against the microphone M when the windshield 7 is set to the low position. Then, it is conceivable that the noise caused by the wind noise may be generated, the voice recognition rate when performing voice activation may be reduced, and the unclear telephone call may be caused.

In the windshield control device according to the present invention, the windshield 7 is driven with the voice input into the microphone M or a predetermined switch manipulation as a trigger, so that the traveling wind blowing against the microphone M can be blocked out, and the assist of the voice input can be achieved. Also, it is possible that when the windshield 7 is moved up, the noise is measured by the microphone M, and only when the noise is high, the windshield 7 is automatically moved to the high position.

Figure 2:
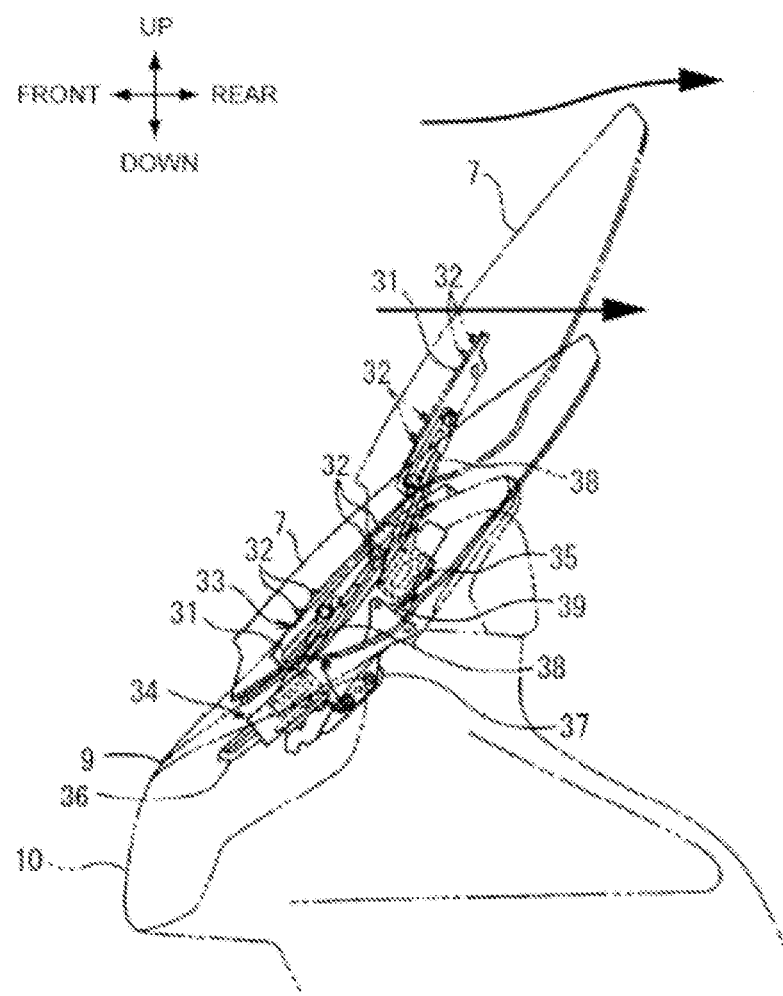
FIG. 2 is an enlarged view around a windshield.

FIG. 2 is a partially enlarged view around the windshield 7. A driving system 34 for vertically moving the windshield 7 is provided with a guide part 39 that is attached to the front cowl 9 and that extends in a vertical direction, and the actuator 47 as the power source for sliding the windshield 7 along the guide part 39.

A movable part 35 and the actuator 37 that are respectively slidably supported by the guide part 39 are connected to each other through a push cable 36. The movable part 35 is vertically moved while being guided by the guide part 39 through the push cable 36, according to driving of the actuator 37. The windshield 7 made of colorless and transparent cured resin is mounted using fastening members 32 with respect to a mounting member 31 coupled to the movable part 35 through a slide mechanism.

With this construction, the windshield 7 can be adjusted in a variable manner between a lowermost position shown by a solid line and an uppermost position shown by a two-dot chain line while an inclination angle of the windshield is gradually changed. An angle of the windshield 7 is set to a state where the inclination angle is sharpest when the windshield 7 is set to the lowermost position, and also is set to a state where the inclination angle is gentlest when the windshield 7 is set to the uppermost position. For this reason, such a high windbreak effect that the traveling wind is hardly blown against the helmet H is produced.

Figure 3:
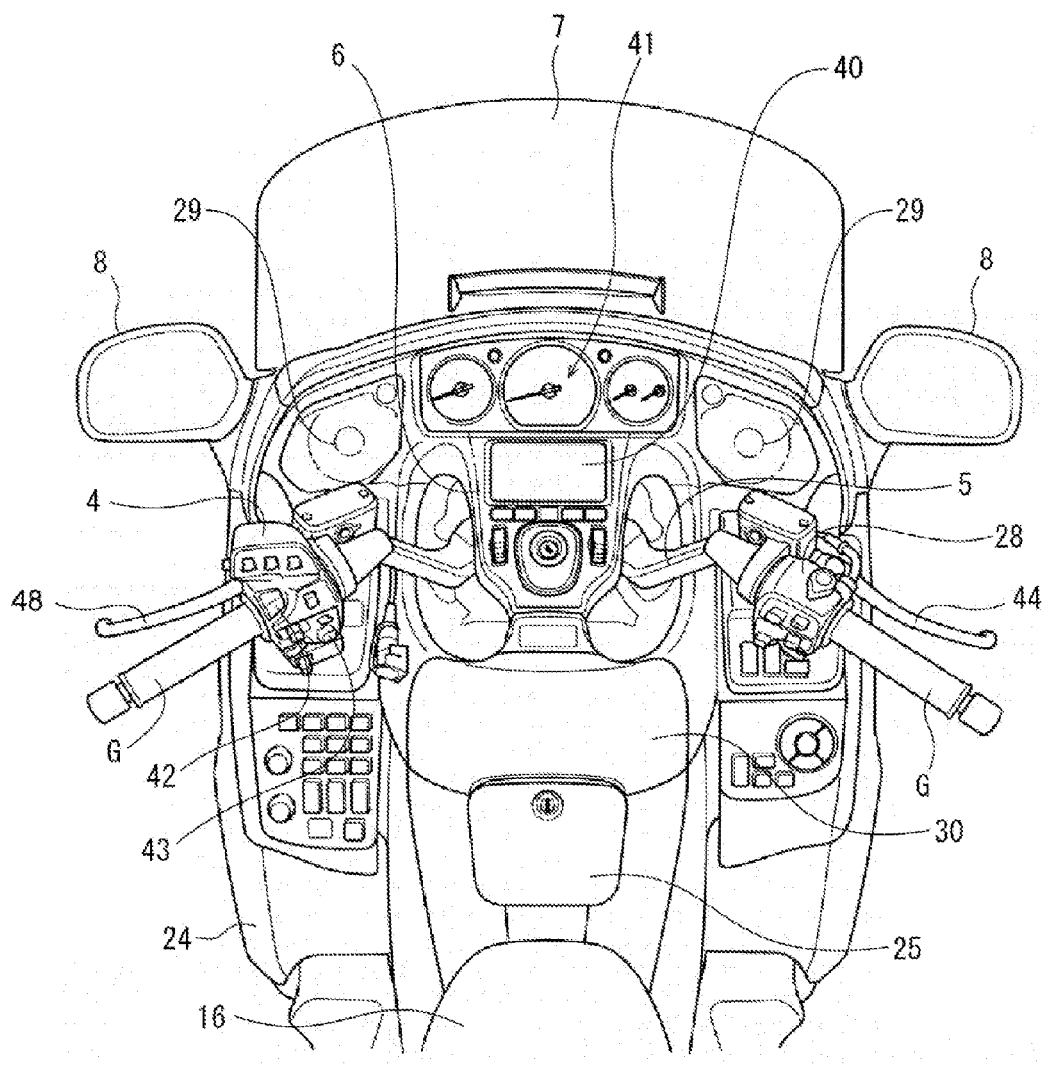
FIG. 3 is an enlarged plan view of a front half portion of a vehicle.

FIG. 3 is an enlarged plan view of a front half portion of the vehicle. This drawing corresponds to a state when viewed from a line of sight of the rider P. A display 40 for displaying a map of the navigation device, an operation screen of an audio device, or the like is arranged on the meter panel 6 of a meter device 41 including a speedometer, an engine tachometer and the like. External speakers 29 outputting music or the like played by the audio device are provided on the right side and the left side of the meter device 41. Also, a cover 30 for an airbag system is arranged between the steering handlebar 5 and the filler lid 25.

A front wheel brake lever 44, a right switch box 28 provided with a start switch, a stop switch, and the like for the engine 13, and a grip G as a turning-type throttle device are attached to the right side of the steering handlebar 5. On the other hand, a clutch lever 48, a left switch box 4 provided with a blinker switch, a horn switch, and the like, and a grip G are attached to the left side of the steering handlebar 5.

In the embodiment, the left switch box 4 is provided with a windshield operating switch 42 for optionally adjusting the height of the windshield 7 by the rider, and an active switch 43 configured to give a command to start the voice activation. The windshield operating switch 42 is formed as a seesaw switch that can be vertically push-pressed around a swing shaft, and the active switch 43 is formed as an automatically return push-button switch. Shapes, arrangement and the like of various kinds of switches can be optionally changed.

Figure 4:
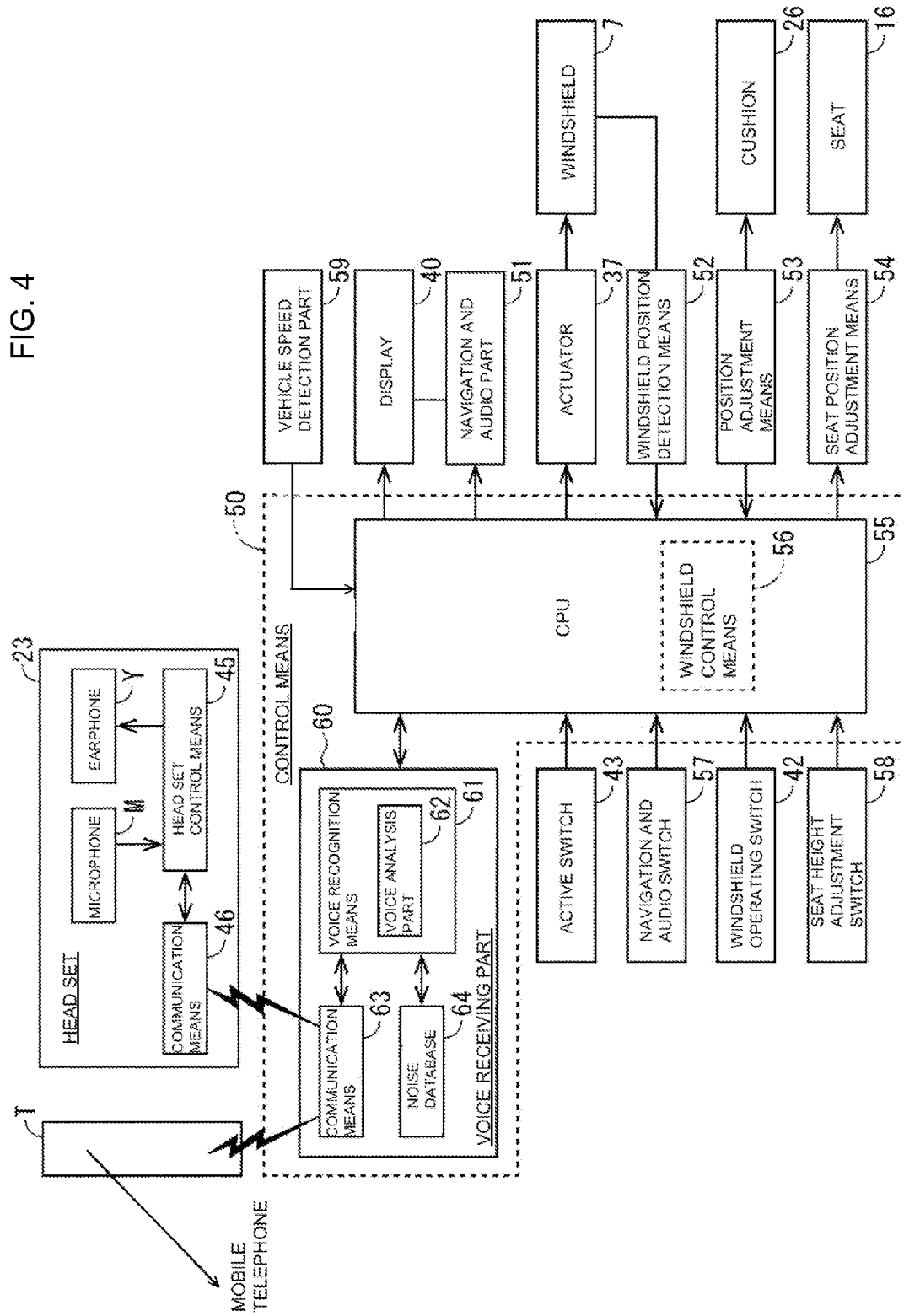
FIG. 4 is a block diagram showing the entire structure of the windshield control device.

FIG. 4 is a block diagram showing the entire structure of the windshield control device. In the specification, the entire system that cooperates including not only the windshield 7 and windshield control means 56 for driving and controlling the windshield but also the actuator 37, the head set 23, a voice receiving part 60 and the like, is called the windshield control device.

In addition to the microphone M and the earphone Y, communication means 46 for allowing radio communication with the control means 50 provided on the side of the vehicle body, and head set control means 45 that detects the tone signal input from the microphone M, that starts the communication means 46, that converts the tone signal, and the like, are included in the head set 23. A power supply such as a small battery can be included in the head set 23.

The control means 50 includes a voice receiving part 60 performing tone signal communication or the like with the head set 23, and a CPU 55 for driving, controlling or the like the windshield 7. The windshield control means 56 is made to serve as a part of the CPU 55, and is stored in the CPU 55. Hereinafter, the total control including the driving of the windshield 7 is occasionally expressed in such a way that the total control is performed by the control means 50 including the voice receiving part 60 and the CPU 55. Also, the drive control of the windshield 7 is occasionally expressed in such a way that the drive control thereof is performed by the CPU 55 including the windshield control means 56.

The voice receiving part 60 includes communication means 63, voice recognition means 61, and a noise database 64. The communication means 63 mainly performs intercommunication of the tone signal between the communication means 63 and the head set 23, and performs simultaneous communication between the communication means 46 of the head set 23 and the mobile telephone T when performing communication through the mobile telephone T using the head set 23.

When the rider voice-activates various kinds of apparatuses mounted on the vehicle, a directive command intended by the rider is recognized based on the tone signal input from the communication means 63 by checking against the voice database included in a voice analysis part 62, and is transmitted to the CPU 55. The CPU 55 performs control based on the recognized directive command with respect to the various kinds of apparatuses mounted on the vehicle.

In addition to the signals from the active switch 43 and the windshield operating switch 42, signals from a navigation and audio switch 57 for operating a navigation and audio part 51, a seat height adjustment switch 58 for operating seat position adjustment means 54, and vehicle speed detection means 59 for detecting the speed of the vehicle are input into the CPU 55. Also, a signal from windshield position detection means 52 for detecting the position of the windshield 7 is input into the CPU 55.

In the embodiment, as the devices capable of being voice-activated, in addition to the navigation and audio part 51, rear cushion position adjustment means 53 for the rear cushion 26 and seat position adjustment means 54 for the seat 16 are exemplified. However, if the devices capable of being voice-activated are configured to be controlled by the CPU 55, various kinds of apparatuses such as a lamp device like a blinker device, and an air conditioner can be defined as the devices capable of being voice-activated.

In the windshield control device according to the present invention, the signal related to the head set 23 is received by the voice receiving part 60, and according to the signal, the windshield 7 can be upwardly moved by the CPU 55. The signal related to the head set 23 can be defined as the tone signal input from the microphone M to operate the head set 23 or the voice receiving part 60. Specifically, a voice command to upwardly move the windshield 7 can be given to the microphone M during traveling.

Also, the signal related to the head set 23 can be defined as the manipulated signal of the active switch 43 for operating the head set 23 or the voice receiving part 60. In this case, according to the manipulation of the active switch 43, the signal can be set such that the windshield 7 is moved to the uppermost position.

Note that the signal related to the head set 23 may be an outgoing signal by the mobile telephone T or an incoming signal with respect to the mobile telephone T. Also, the distance required to upwardly move the windshield 7 after the signal related to the head set 23 is received may be changed according to the vehicle speed detected by the vehicle speed detection means 59.

On the other hand, in the windshield control device according to the present invention, when the noise included in the tone signal input from the microphone M is generated by the wind noise and the noise is higher than the predetermined value, the CPU 55 (windshield control means 56) automatically drives the actuator 37 in order to upwardly move the windshield 7, and the noise interfering with the voice activation or the like can be reduced.

In order to achieve this, the voice receiving part 60 is provided with the noise database 64 with a plurality of sample data of the wind noise with respect to the microphone M stored. The voice recognition means 61 analyzes the tone signal input from the microphone M and compares the analyzed tone signal with the sample data, so that only the noise caused by the wind noise can be extracted and recognized. Herewith, the tone signals with no effect expected even if the windshield 7 is moved, such as the voice of the rider P, the output from the speakers 29, ambient noise from the outside, and the like, can be excluded from noises intended for driving the windshield 7.

Figure 5:
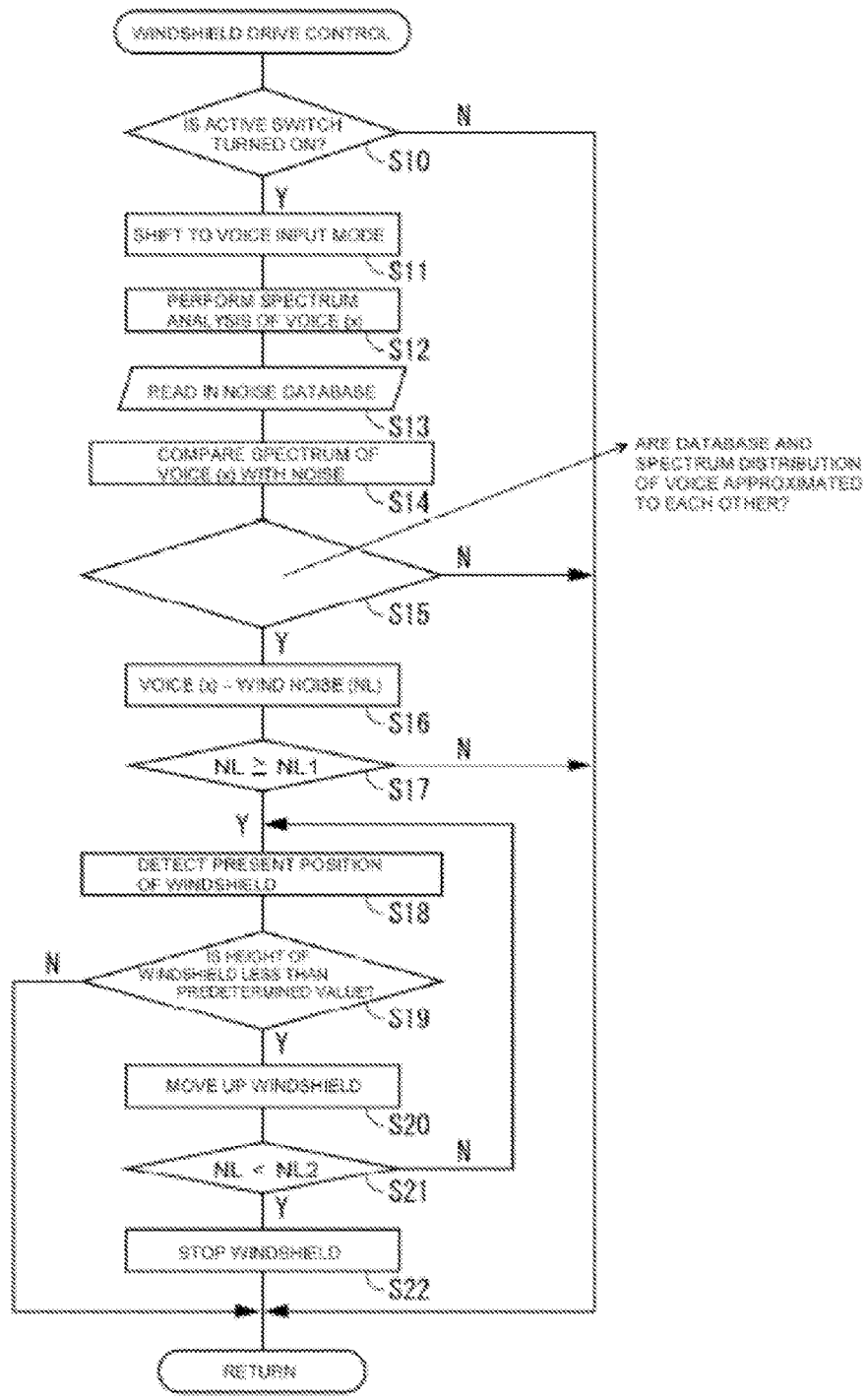
FIG. 5 is a flowchart showing a procedure of windshield drive control.

FIG. 5 is a flowchart showing a procedure of the windshield drive control. The flowchart responds to the procedure when the navigation device or the like is voice-activated by the intention of the rider P during traveling the vehicle.

In Step S10, it is determined whether or not the active switch 43 is turned on by the rider P. If determination in Step S10 results in affirmative, that is, if it is determined that the active switch 43 is turned on, the processing proceeds to Step S11, and the voice receiving part 60 is started, thereby shifting to a voice input mode for receiving the tone signal input from the microphone M. At this time, the active switch 43 functions as a switch that is configured to give a command to start the voice input to operate the voice receiving part 60, and also to give a command to automatically adjust the windshield 7 according to the noise.

In Step S12, spectrum analysis of the input tone signal (voice (x)) is performed. In the succeeding Step S13, the noise database 64 is read in. In Step S14, a spectrum of the voice (x) and the noise database 64 are compared with each other. Comparison of the spectrum of the tone signal with the noise database 64 is performed in consideration of a magnitude of the tone signal or a frequency, or the magnitude of the tone signal and the frequency.

In Step S15, it is determined whether or not the noise database 64 and spectrum distribution of the voice (x) are approximated to each other. If determination in Step S15 results in affirmative, the processing proceeds to Step S16, and it is determined that the input voice (x) is the wind noise NL (noise level NL).

In Step S17, it is determined whether or not the wind noise NL exceeds the first predetermined value NL1. If determination in Step S17 results in affirmative, the processing proceeds to Step S18. Note that if determination in Steps S10, S15 and S17 result in negative, control is terminated without further processing.

In Step S18, the present position of the windshield 7 is detected. The position of the windshield 7 can be detected by an integrated value of the drive signal of the actuator 37, a potentiometer (not shown) attached to the windshield 7, and the like.

Then, in Step S19, it is determined whether or not the height of the windshield 7 is less than the predetermined value (upper limit) If determination in Step S19 results in affirmative, the processing proceeds to Step S20, and the driving to move up the windshield 7 is started. If determination in Step S19 results in negative, sequence control is terminated without further processing as the windshield 7 is identified as being already set to enough height.

In Step S21, it is determined whether or not the noise level NL is less than the second predetermined value NL2 lower than the first predetermined value NL1. That is, in the embodiment, based on the magnitude of the noise caused by the wind noise included in the received tone signal, the windshield 7 can be upwardly moved and can be adjusted to an optional height by the CPU 55. The traveling wind does not blow against the microphone M in association with the upward movement of the windshield, and the noise reduced. For this reason, in Step S13, the voice input can be achieved with a high voice recognition rate kept.

If determination in Step S21 results in affirmative, that is, if it is determined that the noise level NL is lowered to an enough value required for the voice input, the driving of the windshield 7 is stopped in Step S22. On the other hand, if determination in Step S21 results in negative, the processing is returned to Step S18 as the value of the noise level NL is identified as being still high.

Herewith, in association of the reduction in the noise with the moving up of the windshield 7, the movement of the windshield is temporarily stopped in the necessary and sufficient height, and the position of the windshield 7 can be prevented from becoming unnecessarily higher. This leads to the following. If there is a difference between the first predetermined value NL1 and the second predetermined value NL2, hysteresis can be set to a movement condition of the windshield, and the windshield 7 is prevented from being frequently moved.

Note that the voice input mode is canceled with remanipulation of the active switch 43 or execution of the directive command of the voice activation with respect to the target apparatus as a trigger. For this reason, for example, when the noise level NL again exceeds the first predetermined value NL1 before the voice input mode is canceled after the driving of the windshield 7 is stopped, the driving of the windshield 7 can be restarted. Herewith, the windshield 7 can be further moved up according to the case where although the noise level NL is sufficiently lowered by the first driving, the noise level NL is subsequently increased because the vehicle speed is increased or the rider P straightens up his/her back before the voice input mode is canceled.

Note that although time from the manipulation of the active switch 43 until completion of the movement of the windshield 7 is very short (for example, 1 to 3 seconds), the time may be set so that the rider P is kept waiting for the voice input until the movement of the windshield 7 is completed by a method for displaying on the display 40 that the noise is still detected, a method for outputting an alarm sound to the earphone Y, or the like.

Also, when the voice input for the voice activation is terminated, the voice input mode is canceled; however, the termination of the voice input can be set with the execution of the directive command for the voice activation as the trigger. Further, a waiting state is kept even after the execution of the directive command, and the remanipulation of the active switch 43 can be made to serve as the trigger or the lapse of a predetermined time in the waiting state can be made to serve as the trigger for the termination of the voice input.

On the other hand, after the voice input mode is canceled, the windshield 7 can be set so as to be automatically returned to a default position before the active switch 43 is first manipulated. For this reason, it is not necessary to manually return the windshield 7 to the original position after the noise reduction is no more required, and convenience and conformableness can be improved.

Figure 6:
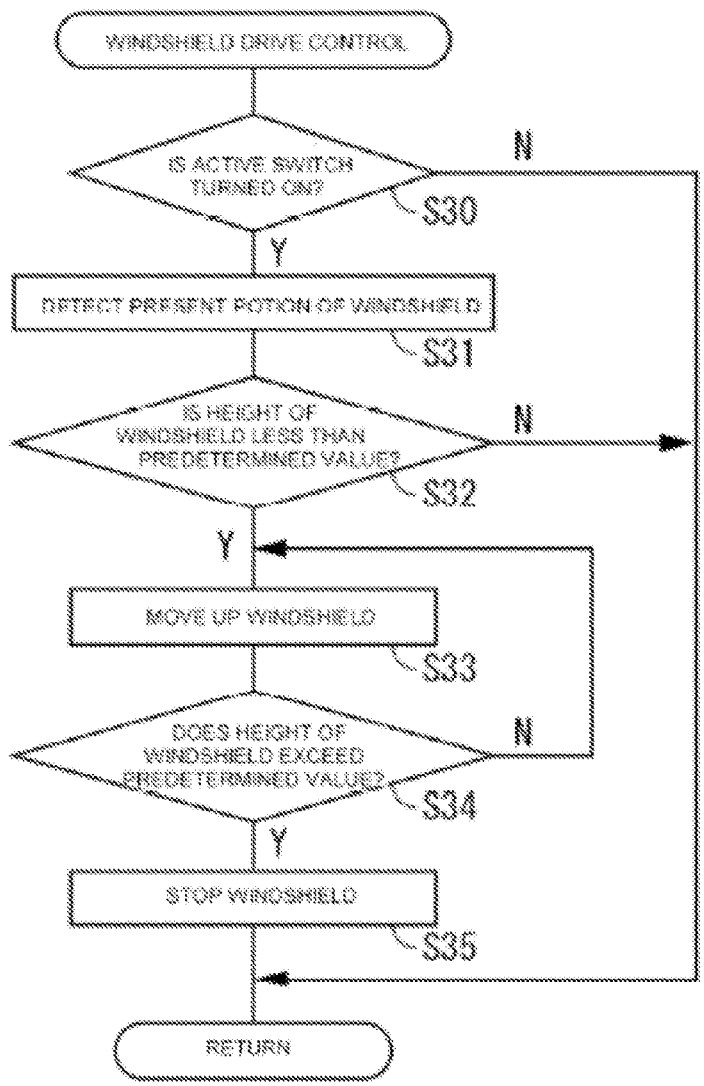
FIG. 6 is a flowchart showing a procedure of windshield drive control according to an alternative of the embodiment.

FIG. 6 is a flowchart showing a procedure of windshield drive control according to an alternative of the embodiment. In the alternative, when the manipulated signal of the active switch 43 is detected as the signal related to the head set 23, the windshield 7 is moved up to maximum height with the detection as the trigger. Since the noise is reduced in association with the moving up of the windshield, the voice activation and the telephone call through the mobile telephone while keeping clear voice can be achieved.

In Step S30, it is determined whether or not the active switch 43 is turned on. If determination in Step S30 results in affirmative, the processing proceeds to Step S31. In Step S31, the present position of the windshield 7 is detected. In Step S32, it is determined whether or not the height of the windshield 7 is less than the predetermined value. In the alternative, the predetermined value is set to driving upper limit of the windshield 7. If the height of the windshield 7 is less than the upper limit, the processing proceeds to Step S33 as there is such a space that the windshield 7 can be still moved up. Note that if determination in Step S30 or Step S32 results in negative, the sequence control is terminated without further processing.

In Step S33, the driving to move up the windshield 7 is started. In Step S34, it is determined whether or not the height of the windshield 7 exceeds the predetermined value. If determination in Step S34 results in affirmative, that is, if it is determined that the windshield 7 reaches the maximum position, the processing proceeds to Step S35. Then, the moving up of the windshield 7 is stopped, and the sequence control is terminated.

Note that in the alternative, the signal related to the head set 23 is identified as the manipulated signal of the active switch 43; however, the signal may be the tone signal input into the microphone M.

Figure 7:
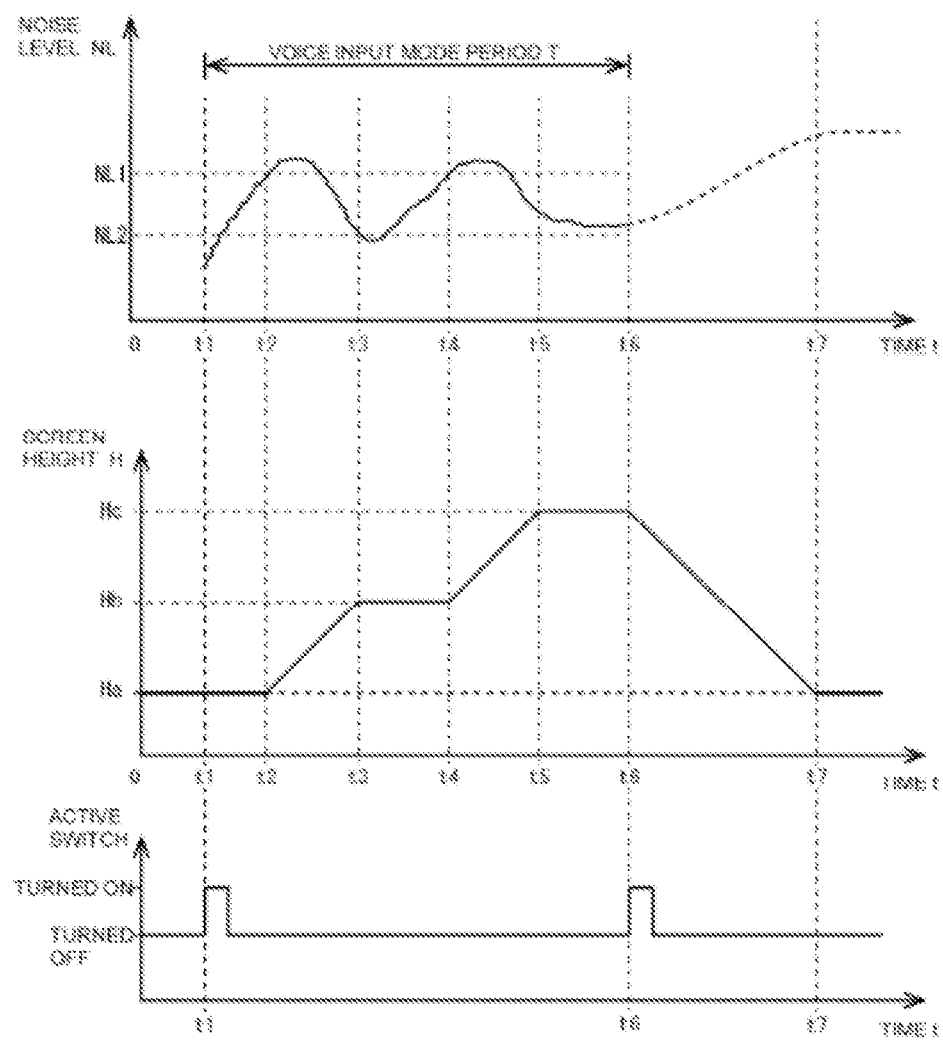
FIG. 7 is a time chart showing a relation between a drive mode of the windshield and a noise level.

FIG. 7 is a time chart showing a relation between a drive mode of the windshield 7 and the noise level. The time chart shows details of control over height adjustment in the windshield drive control shown in FIG. 5. From an upper stage, a graph (a) is indicative of the noise level NL, a graph (b) is indicative of screen height H, and a graph (c) is indicative of the operating state of the active switch 43. In the graph (a) showing the noise level NL, the first predetermined value NL1 and the second predetermined value NL2 lower than the first predetermined value NL1 are set as predetermined thresholds.

In time t1, the active switch 43 is manipulated in order to perform the voice activation by the rider with respect to the navigation device or the like. Together with this, the analysis of the tone signal by the voice receiving part 60 is started; however, the noise level NL caused by the wind noise is lower than the first predetermined value NL1. Therefore, the driving of the windshield 7 is not started, and the windshield height H is kept in an initial height Ha.

Note that when the noise level NL already exceeds the first predetermined value NL1 when the active switch 43 is turned on and preparation to drive the windshield 7 is completed, that is, when voice input mode period T is started, the movement of the windshield 7 is started together with the start of the voice input mode period T.

Under an example in the graph, the noise level NL exceeds the first predetermined value NL1 in time t2, and accordingly, the upward movement of the windshield 7 is started. Next, in time t3, according to the fact that the noise level NL is less then the second predetermined value NL2, the windshield 7 is stopped in height Hb.

After the windshield is temporarily stopped in the height Hb, the windshield 7 keeps a stopped state even if the noise level NL is slightly increased or lowered. Therefore, hunting is prevented from being caused according to a slight change in the noise level NL. On the other hand, when it takes time to perform the voice input, during that period, it may be conceivable that the vehicle speed is increased or the noise level NL is increased by a change in a posture of the rider P.

In time t4, since the noise level NL is increased as described above, the noise level NL again exceeds the first predetermined value NL1, and the moving up of the windshield 7 is restarted.

Under an example in the drawing, the screen height H reaches the upper limit Hc before the noise level NL is less than the second predetermined value NL2 after the moving up of the windshield is started in time t4. After that, the voice activation is terminated, and in time t6, the rider P manipulates the active switch 43. Herewith, the voice input mode is canceled, and also the driving of the windshield 7 in a returning direction is started. In time t7, the windshield is returned to height Ha as the default position in time t1.

Figure 8:
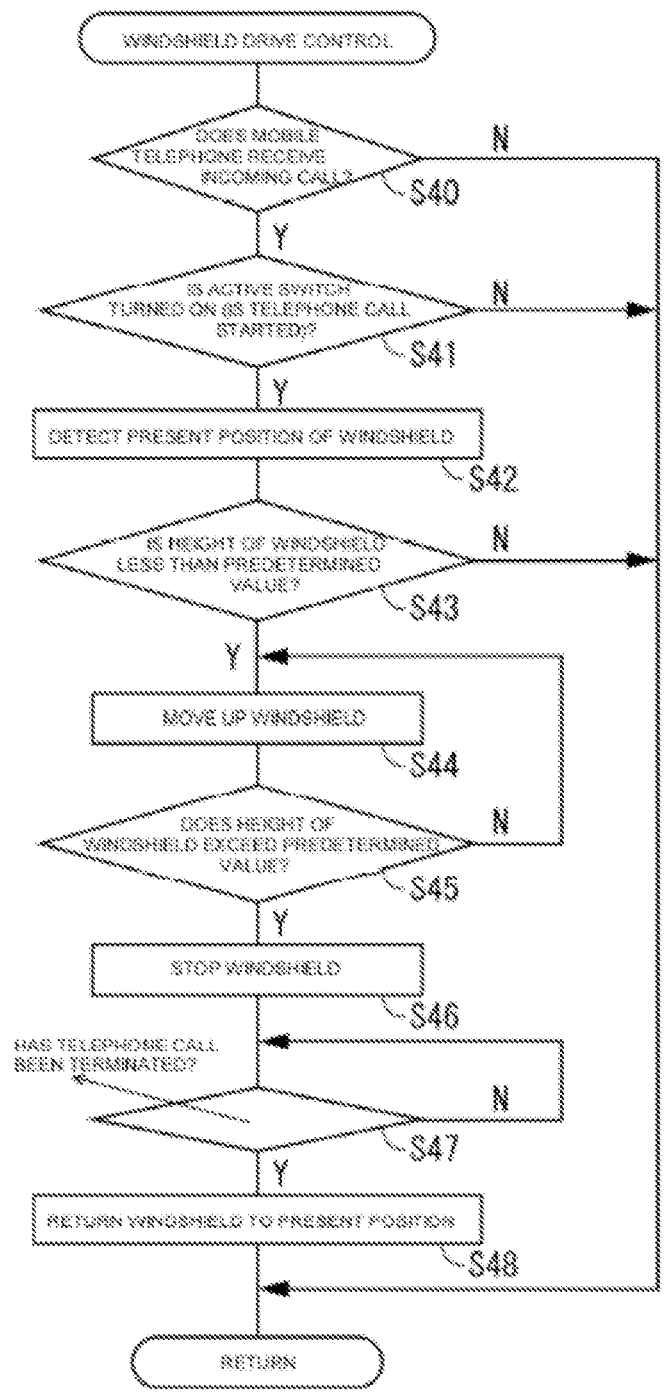
FIG. 8 is a flowchart showing a procedure of windshield drive control according to a second alternative of the embodiment.

FIG. 8 is a flowchart showing a procedure of windshield drive control according to a second alternative of the embodiment. In the alternative, when the manipulated signal of the active switch 43 is detected as the signal related to the head set 23 according to the incoming call (call-in) from the other party during traveling of the vehicle in making the telephone call through the mobile telephone T using the head set 23, the windshield 7 is moved up to the maximum height with the detection of the manipulated signal as the trigger.

In Step S40, it is determined whether or not the mobile telephone T receives the incoming call. If determination in Step S40 results in affirmative, the processing proceeds to Step S41. The rider P is informed of the incoming call with respect to the mobile telephone T by the output of beep to the earphone Y, an incoming number or name displayed on the display 40, or the like. In Step S41, it is determined whether or not the active switch 43 is turned on. If it is determined that the active switch is turned on in order to start the telephone call, the processing proceeds to Step S42.

In Step S42, the present position P0 of the windshield 7 is detected. In succeeding Step S43, it is determined whether or not the height of the windshield 7 is less than the predetermined value (upper limit) If determination in Step S43 results in affirmative, the processing proceeds to Step S44, and the driving to move up the windshield 7 is started. Note that if determination in Steps S40, S41, S43 results in negative, it is determined that it is not necessary to drive the windshield 7, and the sequence control is terminated without further processing.

In Step S45, it is determined whether or not the height of the windshield 7 exceeds the predetermined value. If determination in Step S45 results in affirmative, that is, if it is determined that the windshield 7 reaches the maximum position, the processing proceeds to Step S46, and the moving up of the windshield 7 is stopped. On the other hand, if determination in Step S45 results in negative, the processing is returned to Step S44, and the moving up of the windshield is continued.

In Step S47, it is determined whether or not the telephone call through the mobile telephone T has been terminated. Note that the termination of the telephone call through the mobile telephone T can be detected also by disconnecting the telephone by the intended party in addition to the manipulation of the active switch 43 and a talk switch of the mobile telephone T. Then, if determination in Step S47 results in affirmative, the processing proceeds to Step S48, the windshield 7 is returned to the present position P0, and the sequence control is terminated.

Note that during a period from the manipulation of the active switch 43 to the completion of the movement of the windshield 7, such setting is allowed that switching into a telephone call state is made to stand ready, recorded information for asking the other party to wait is played back, or the like. On the other hand, when it is not necessary to move the windshield 7 because the noise level NL is low, the telephone call can be started while breaking a circuit.

Also, when making an outgoing call (call request) from the rider P to the other party, the mobile telephone T can be operated by the voice input after shifting to the voice input mode by the manipulation of the active switch 43.

The configuration of the motorcycle, the shapes and structure of the windshield and the head set, the shapes and arrangement of the various kinds of switches, the modes of the control means and various kind of databases, the setting modes of the first predetermined value and the second predetermined value of the noise level, the apparatuses and contents of the operation for performing the voice activation, and the like, are not limited to the above-mentioned embodiments, and various changes cay be made thereto. For example, the upward movement of the windshield can be also automatically performed without depending on the manipulation of the active switch. Also, a switch may be provided, the switch being configured to allow assistance of manual operation during the automatic driving of the windshield and to optionally cancel the automatic adjustment of the windshield. The windshield control device according to the present invention can be applied to various kinds of vehicles such as saddle-ride type three-wheeled/four wheeled vehicles in addition to the motorcycles.

The invention claimed is:

1. A windshield control device comprising:
   voice receiving part configured to receive a signal related to a head set having a microphone; and
   CPU configured to drive and control a windshield attached to a front part of a vehicle,
   wherein the CPU is configured to upwardly move the windshield according to the signal received by the voice receiving part, and
   a position and/or an angle in a height direction of the windshield is adjusted by an actuator.

2. The windshield control device according to claim 1, wherein the signal is a tone signal input from the microphone.

3. The windshield control device according to claim 1, wherein the signal is a manipulated signal of an active switch for operating the head set or the voice receiving part.

4. The windshield control device according to claim 2, wherein the CPU is configured to upwardly move the windshield according to a frequency and/or magnitude of the tone signal input from the microphone after the voice receiving part is operated.

5. The windshield control device according to claim 2, wherein the voice receiving part is provided with at least either voice analysis part that recognizes voice of a rider wearing the headset included in the tone signal in order to voice-activate an apparatus loaded on the vehicle or communication means that transmits and receives the tone signal between the communication means and a mobile device carried by the rider.

6. The windshield control device according to claim 1, further comprising
   a vehicle speed detection part that detects a speed of the vehicle,
   wherein the CPU is configured to upwardly move the windshield according to a speed of the vehicle.

7. The windshield control device according to claim 3, wherein the active switch is configured to double as a switch to give at least one of a command to start voice activation with respect to the apparatus loaded on the vehicle, a command to start transmission by a mobile device, and a command to start a response to an incoming call with respect to the mobile device.

8. The windshield control device according to claim 4,
   wherein the voice recognition part is configured to detect a noise level included in the tone signal, and
   the CPU is configured to upwardly move the windshield when the noise level exceeds a first predetermined value.

9. The windshield control device according to claim 8, wherein the CPU is configured to stop upward movement of the windshield when the noise level is less than a second predetermined value lower than the first predetermined value during the upward movement of the windshield.

10. The windshield control device according to claim 9, wherein the CPU is configured to restart the upward movement of the windshield when the noise level again exceeds the first predetermined value after the noise level is less than the second predetermined value.

11. The windshield control device according to claim 1, further comprising:
    a noise database for storing sample data of noise caused by traveling wind,
    wherein the CPU is configured to recognize the noise included in the tone signal received by the microphone by comparing with the sample data.

12. The windshield control device according to claim 7, wherein the CPU is configured to return the windshield to a position before the active switch is manipulated, when detecting either termination of the voice activation with respect to the apparatus loaded on the vehicle or termination of a telephone call through the mobile device, after the active switch is manipulated.

13. The windshield control device according to claim 3, wherein the CPU is configured to upwardly move the windshield according to a frequency and/or magnitude of the tone signal input from the microphone after the voice receiving part is operated.

14. The windshield control device according to claim 3, wherein the voice receiving part is provide with at least either voice analysis part that recognizes voice of a rider wearing the headset included in the tone signal in order to voice-activate an apparatus loaded on the vehicle or communication means that transmits and receives the tone signal between the communication means and a mobile device carried by the rider.

* * * * *